(12) United States Patent
Parks et al.

(10) Patent No.: US 6,924,897 B2
(45) Date of Patent: Aug. 2, 2005

(54) POINT SOURCE MODULE AND METHODS OF ALIGNING AND USING THE SAME

(76) Inventors: Robert E. Parks, 5130 N. Calle de la Cina, Tucson, AZ (US) 85718; William P. Kuhn, 9181 E. Ocotillo Dr., Tucson, AZ (US) 85749-9446

( * ) Notice: Subject to any disclaimer, the term of this patent is extended or adjusted under 35 U.S.C. 154(b) by 654 days.

(21) Appl. No.: 09/975,389

(22) Filed: Oct. 9, 2001

(65) Prior Publication Data

US 2002/0054296 A1 May 9, 2002

Related U.S. Application Data

(60) Provisional application No. 60/241,914, filed on Oct. 19, 2000.

(51) Int. Cl.$^7$ ................................................. G01B 9/02
(52) U.S. Cl. ........................................ 356/512; 356/508
(58) Field of Search ............................... 356/512, 513, 356/514, 508

(56) References Cited

U.S. PATENT DOCUMENTS 6,459,490 B1 * 10/2002 Kuhn et al. ................. 356/520
6,738,147 B2 * 5/2004 Yafuso ........................ 356/508

OTHER PUBLICATIONS

Application of a Shack cube as a beam splitter in interferometers with a local reference beam, Shen et al, Applied Optics, Dec. 1996, pp 6648–6654.*

W.T. Welford, "Optical Shop Testing", Daniel Malacara, editor, $2^{nd}$ edition, John Wiley & Sons, pp. 397–398 (1992).

J. Ojeda–Castañeda, "Optical Shop Testing", Daniel Malacara, editor, $2^{nd}$ edition, John Wiley & Sons, pp. 265–270 (1992).

R.E. Parks, "Bright, inexpensive pinhole source", Applied Optics, vol. 17, No. 16, p. 2469 (1978).

M.V. Mantravadi, "Newton, Fizeau, and Haidinger Interferometers", Optical Shop Testing, $2^{nd}$ Ed, John Wiley & Sons, Inc., pp. 34–35 (1992).

* cited by examiner

Primary Examiner—Samuel A. Turner

(57) ABSTRACT

A point source module is provided, comprising: a Shack cube comprising a beam splitter cube with an attached spherical reference surface defining a reference arm; a test arm that is associated with transmission of optical radiation from a source to a sample; a point source of optical radiation whose emissions traverse both the reference arm and the test arm; and a detector associated with a surface of the beam splitter cube and receiving optical radiation from both the reference arm and the test arm and comprising a detector arm, an objective lens associated with the test arm, or both. Further, a method of aligning the point source module is provided, along with a method of using the point source microscope is provided. The apparatus and methods provide a compact, robust device and technique for measuring or locating optical or mechanical datum of parts that are being manufactured or assembled.

40 Claims, 4 Drawing Sheets

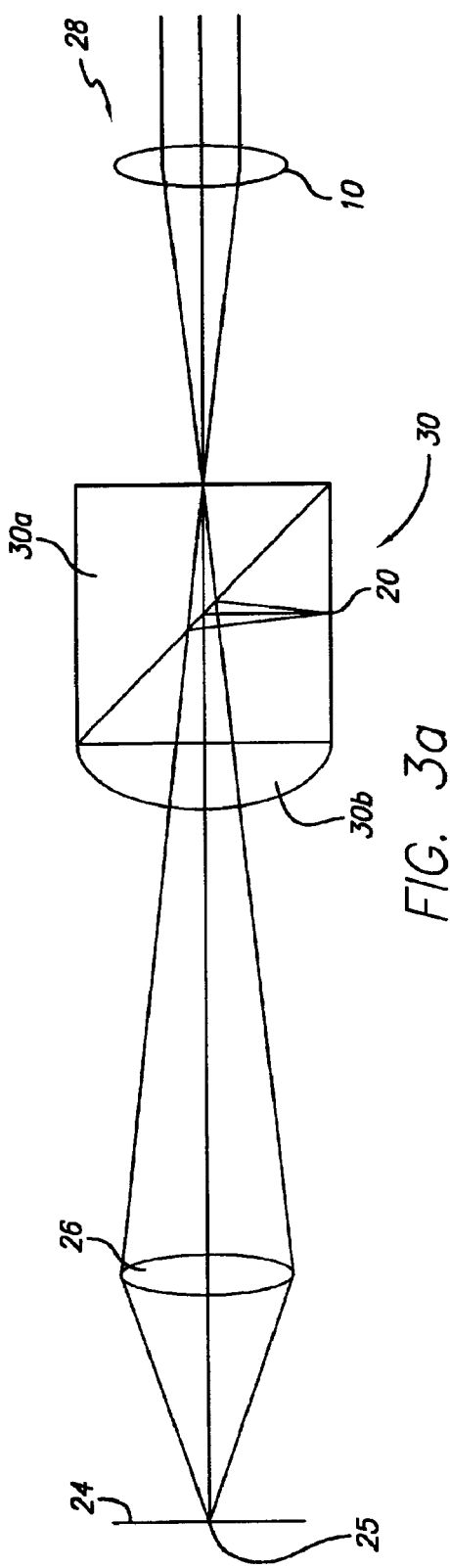
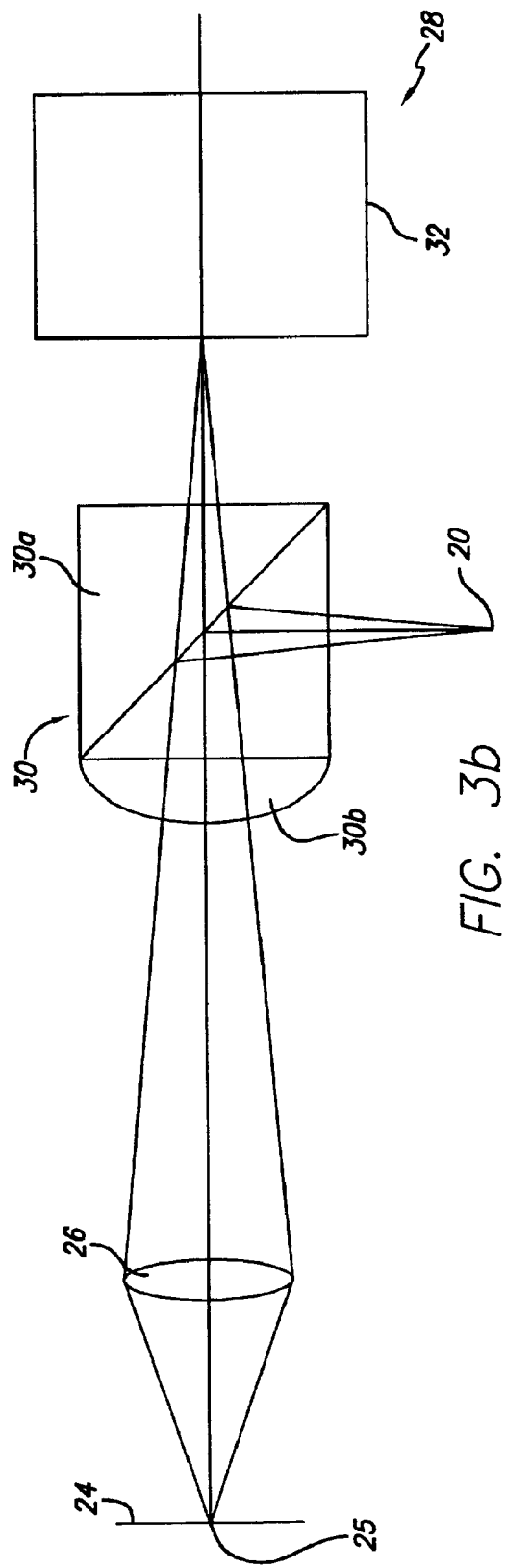
FIG. 3a
FIG. 3b

POINT SOURCE MODULE AND METHODS OF ALIGNING AND USING THE SAME

CROSS-REFERENCE TO RELATED APPLICATION

The present application is a non-provisional application and claims priority from provisional application Ser. No. 60/241,914, filed on Oct. 19, 2000.

TECHNICAL FIELD

The present invention is directed to alignment and inspection of optical systems and precision mechanics and in particular addresses the need to relate mechanical or optical datums to themselves or each other.

BACKGROUND ART

Opticians have long made use of a point source of light for the testing of optical components. Among the earliest of tests is the "Star Test" as described by W. T. Welford in *Optical Shop Testing*, Daniel Malacara, editor, $2^{nd}$ edition, John Wiley & Sons, pp. 397–398 (1992). In this test, a point source of light is used as the source for an optical system and the image produced by the system is examined to estimate the type and size of the defects in the optical component or system. The Foucault knife-edge test also utilizes a point source of light and a sharp edge to locate the center of curvature of a surface and is also described in by J. Ojeda-Castafieda in *Optical Shop Testing*, supra, pp. 265–270.

At least as early as 1972, a point source eyepiece was made and used in a microscope by Ray Boyd at Frank Cooke, Inc. Mr. Boyd started with a fiber optic preform, a ⅛ inch cylinder of glass that was designed for drawing into a glass fiber. The preform was partially drawn, the fiber bent and the tip cleaved. The portion of the preform that was not drawn provided a convenient means for light input. An eyepiece with fiber is shown in FIG. 1.

Parks has described a variation on the manufacturing method of a point source for optical testing using glass fibers rather than a fiber optics preform; see, R. E. Parks, "Bright, inexpensive pinhole source", *Applied Optics*, Vol. 17, No. 16, p. 2469 (1978).

A schematic diagram of a typical microscope is shown in FIG. 2. A real, magnified image of the sample is produced by the objective at the reticle plane, which is the front focal plane of the eyepiece. The eyepiece further magnifies the image at the reticle plane for visual observation. The microscope may be of finite or infinite conjugate design. It is possible to place a detector (e.g., CCD camera) at the reticle plane in place of an eyepiece or at any location behind the objective in conjunction with suitable optics between the objective and detector.

FIG. 1 depicts a point source eyepiece using a carefully fabricated fiber optic component as a point source at the reticle plane of an eyepiece. If a light source, such as a flashlight, is directed at the end of the fiber optic component, then a point source will exist at the reticle plane of the microscope. The microscope objective projects a point of light (i.e., an image of the point source) on to the sample plane. The microscope then produces an image of the illuminated point on the sample at the reticle plane. However, the fiber tip will obscure the return image if the microscope is focused on the surface. If the microscope is not in focus (the sample is displaced from the proper or in focus sample plane), then the image of the point source will be larger than the fiber tip.

The behavior of the point image is different when the microscope is focused near the center of curvature of a spherical object such as a tooling ball, concave or convex mirror or lens, as in FIG. 4a rather than on a surface as shown in FIG. 4b. The point image will be displaced laterally from the fiber tip in proportion to the lateral displacement of the projected point of light from the center of curvature of the spherical object. The size of the point image will also be a minimum size when the microscope is focused at the center of curvature.

A point source eyepiece is most likely to be used in a microscope system with a 10× to 40× microscope objective. The microscope may then be used to create a point source for a Star Test or to locate the center of curvature of an optical component. The point source created will, in general, be diffraction limited in size because the fiber point source will be reduced in size by the microscope magnification of perhaps 10 to 40×. Reflected light from a surface under test is visible in the eyepiece if the microscope is focused at or near the surface or center of curvature of the surface.

The fiber optic eyepiece as described is difficult to manufacture and fragile. Also, it is not convenient to couple in a variety of different light sources such as a halogen source or a laser diode. Additionally, the fiber itself obscures a portion of the field of view. Thus, what is needed is a robust device providing a point source and convenient viewing of a returned point source in a compact package that can be used for inspection of optical components and assemblies.

DISCLOSURE OF INVENTION

In accordance with the present invention, a point source module is provided, comprising:

(a) a Shack cube comprising a beam splitter cube having four optically functional faces, with an optical element having a spherical reference surface secured to one of the four faces and defining a reference arm;

(b) a test arm that is associated with transmission of optical radiation from a source to a sample and through one of the following:
   (i) the reference surface, or
   (ii) a face of the beam splitter cube adjacent the reference surface and on the opposite side of the beam splitting surface from the reference surface;

(c) a point source of optical radiation whose emissions are incident on a face of the beam splitter cube such that light from the source traverses both the reference arm and the test arm; and (d) a detector associated with a face of the beam splitter cube adjacent the source and on the opposite side of the beam splitting surface from the source comprising a detector arm, an objective lens associated with the test arm, or both.

In a variant of the foregoing, an objective lens may be associated with the test arm to produce a point source microscope. In another variant of the foregoing an eyepiece may be installed in the detector arm producing a point source eyepiece for viewing by an eye acting as the detector.

In addition, a method of aligning the point source module is provided. The method comprises using a cat's eye type reflection associated with the objective lens so that images from the spherical reference surface and from the objective lens are coincident or separated, as desired.

Finally, a method of using a point source microscope (point source module plus objective lens) is provided. The method comprises obtaining information relating to optical datums, mechanical datums, or both.

The apparatus and method of the present invention provide a compact, robust device and technique for measuring or locating optical or mechanical datum of parts that are being manufactured or assembled.

BRIEF DESCRIPTION OF THE DRAWINGS

The drawings referred to in this description should be understood as not being drawn to scale except as specifically noted.

FIGS. 3a–3b are each a schematic diagram of a point source microscope using a Shack cube, showing as the detector an eyepiece (FIG. 3a) or a CCD camera (FIG. 3b);

FIG. 7a depicts a finite conjugate relay lens and FIG. 7b depicts a collimator.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

Figure 1:
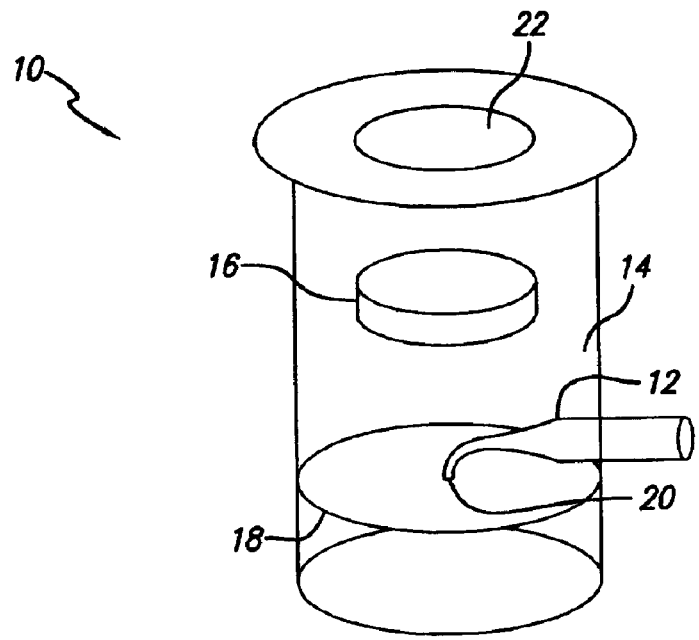
FIG. 1 is a prior art schematic diagram of an eyepiece with fiber source.
Figure 2:
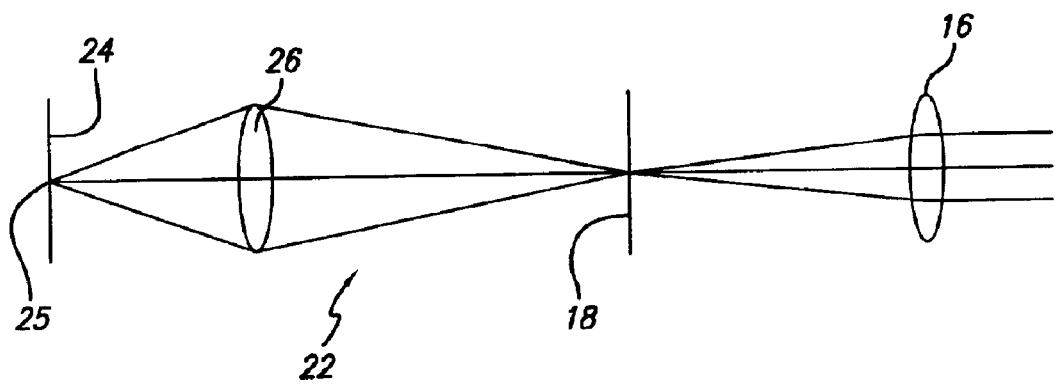
FIG. 2 is a prior art schematic diagram of a microscope.

FIGS. 1 and 2 were briefly described above. In particular, FIG. 1 is a schematic diagram, in perspective, showing the combination of an eyepiece 10 and an optical fiber 12. The eyepiece 10 comprises an eyepiece tube 14, which includes an eyepiece lens 16 and an exit aperture 22. A point source 20 is the tip of optical fiber 12 and is placed in a reticle plane 18. As seen in FIG. 2, the reticle plane 18 is between the eyepiece lens 16 and an objective 26. Returning to FIG. 1, the exit aperture 22 is used for viewing by a person. The optical fiber 12 is seen to be operatively associated with the reticle plane 18.

FIG. 2 is a schematic diagram of a conventional microscope 22. The microscope 22 comprises a sample plane 24 for placing a sample, the objective 26, the reticle plane 18, and the eyepiece lens 16. The reference designation for the sample and the sample plane 24 are used interchangeably herein. The objective 26 focuses light to a focal point 25 on the sample plane 24.

A point source microscope (PSM) 28 in accordance with the present invention, utilizing a Shack cube 30 is shown in FIGS. 3A–3B. A Shack cube 30 is a beam splitter cube 30a to which has been attached an uncoated plano-convex lens 30b; the convex surface of lens 30b is sometimes called a Shack surface. While a cube has, of course, six faces, two are unused in the Shack cube. The four remaining surfaces are referred to herein as being "optically functional", since one or more of these surfaces is employed in the practice of the present invention.

Typically, as shown in FIG. 3a, the convex surface of lens 30b used in making a Shack cube 30 has a radius-of-curvature that is equal to the total thickness of the lens and the beam splitter cube 30b. This makes building a Shack cube interferometer convenient, since a pinhole aperture disc may then be placed on the cube 30. However, the radius-of-curvature of the lens 30b may be less than or more than the total thickness. In the preferred embodiment, as shown in FIG. 3b, the lens radius-of-curvature is large enough so that the point source 20 is conveniently located outside of the cube 30. Moving the point source 20 away from the beam splitter 30b provides space for a detector (e.g., CCD camera 32 shown in FIG. 3b.) behind the cube 30 to receive the focused point images from the Shack reference surface 30a and sample 24 without additional relay lenses.

The point source 20 is most typically a single-mode fiber-optic cable 12 (see, e.g., FIG. 5), but may be a multimode fiber, pinhole aperture disc in a spatial filter assembly or any of these in conjunction with an additional lens or lenses (not shown) to relay the point source. The purpose of a relay lens is to assist in packaging or to change the numerical aperture of the point source 20 used to better match the application. For example, improved precision can be obtained by using a larger numerical aperture so that the focused point of light will be smaller.

The point source 20 and Shack cube 30 may be made as an integral component of an eyepiece assembly to be used with a conventional microscope or can be made as part of a microscope tube for use with conventional eyepieces and objectives.

Figure 4A:
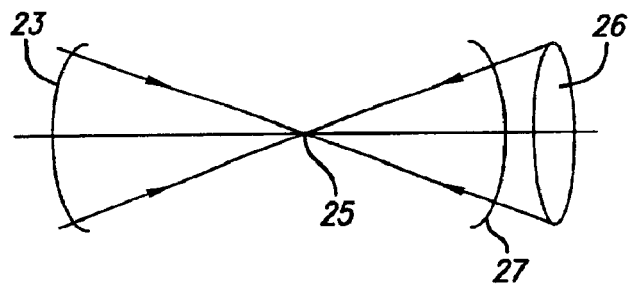
FIGS. 4a–4b are schematic diagrams showing the focus of a microscope objective at the center of curvature of a concave and convex spherical surface (FIG. 4a) or on a surface (FIG. 4b)
Figure 4B:
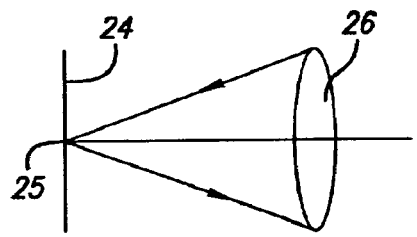

FIG. 4b shows the path of a light ray exiting an objective lens 26, striking a surface 24 and then being reflected back towards the objective. The light ray is representative of light from a point source in a PSM (point source module or microscope) 28. The point image formed on the camera 32 by light striking the surface 24 will be at the same location as the point image formed by light coming from the reference surface 30b in a PSM 28. The point image so formed will vary in size as the axial distance between the objective 26 and surface 24 is varied (i.e., focus is varied). The type of reflection in FIG. 4b is commonly referred to as a cat's eye type of reflection.

For comparison, FIG. 4a is referred to herein as a retroreflection. A pair of light rays exiting the objective 26 is shown intersecting at the center of curvature of a concave surface 23. The rays strike the concave spherical surface 23 normal to the surface and are reflected back along the same path towards the objective 26. The point image formed in this case will vary in size as a result of axial displacement and will also, unlike the cat's eye type reflection, shift laterally on the detector 32 in proportion to the distance the objective 26 is displaced laterally from the center of curvature.

Figure 5:
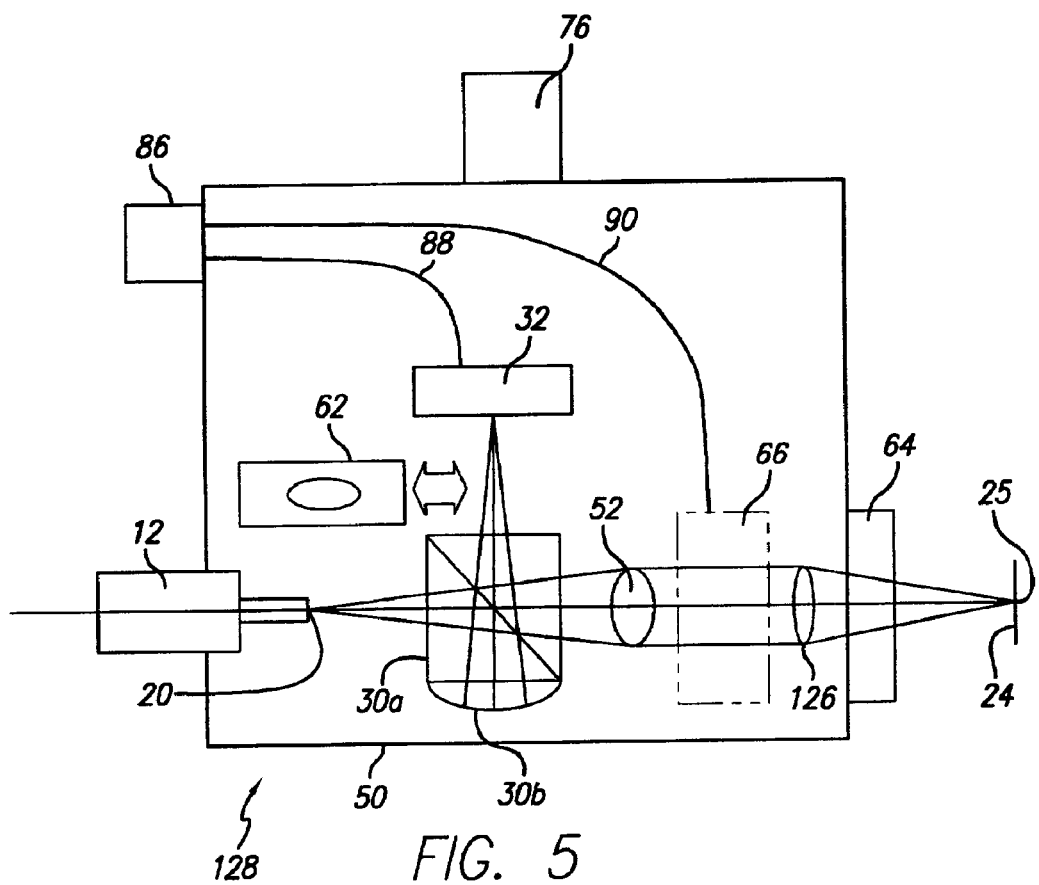
FIG. 5 is a schematic diagram of a point source microscope of the present invention using a modified Shack cube arrangement.

An alternative design for a point source microscope (PSM) 128 of the present invention is shown in FIG. 5. A compact housing 50 is made possible through the use of a revised optical design. As before, there is a point source 20 of light that is indicated as a fiber optic connector 12 in the Figure. The fundamental difference between this design and the previous design is the rotation of the Shack cube 30 so that the Shack lens 30b is not part of the test arm, which is the optical path for imaging the sample 24. Instead, light from the point source 20 is transmitted through the beam splitter 30a to a collimating lens 52 and to an objective lens 126. As a result of this design, precise transverse alignment of the point source 20 to collimating lens 52 and objective lens 126 is easily obtained. The light source 20 may be a fiber-coupled light emitting diode, laser, laser diode, or other light source permitting the use of coherent or incoherent light sources. It is also possible to use as source 20 an incandescent light bulb or light emitting diode in conjunction with a lens or lenses (not shown) and a pinhole (small aperture) (not shown).

Light from the point source 20 strikes the beam splitter 30a and the transmitted light is collimated by collimating lens 52 and brought to focus by objective lens 126 in the test arm (beam splitter 30a to sample 24) of the PSM 128. The lenses 52 and 126 may have the same or different focal lengths, providing the ability to have an output numerical aperture different than the numerical aperture of the source 20. This is helpful, since single-mode optical fiber typically has a small numerical aperture. The small numerical aperture of a fiber 12 has a benefit in that only a small amount of spherical aberration is introduced by the beam splitter cube 30. Lenses 52 and 126 are typically glass molded aspheric elements having high wavefront quality resulting in a small spot size (typically diffraction limited) for the projected spot. If the projected point image produced by lens 126 is at or near a surface or center-of-curvature of a spherical surface, then a portion of the light reflected or scattered by the surface will form a point image on the camera 32 after reflection from the beam splitter 30a.

A portion of the light from the point source 20 is reflected by the beam splitter 30a towards the Shack reference surface 30b. Light reflected from the reference surface 30b forms a reference point image on the camera 32. The reference surface 30b may have a reflective coating to control the brightness of the reference point as well as to reduce stray light that is transmitted through the reference surface. Additionally, the Shack lens 30b may be made of a partially light absorbing material or a filter (not shown) may be placed between the Shack lens 30b and the beam splitter 30a to control stray light and to balance the relative brightness of the optical radiation from the spherical reference surface and from the sample via the objective. The reference and test images are coincident in FIG. 5 and are indicated by the intersecting lines (rays) at the camera 32.

The collimating lens 52 and objective lens 126 can be considered to be a single objective lens assembly or lens module. Additionally, it is possible to intentionally incorporate astigmatism in the objective lens 126 or collimating lens 52. The result is that the point image resulting on the detector will be circular at the optimal focus; however, either side of focus the image will appear as a short line segment. More useful, though, is that the orientation of the line segment on one side of focus will be orthogonal to the line segment on the other side of focus, thereby making it obvious which side of focus one is on as well as increasing the precision with which the optimal focus position of the PSM can be set. It is possible to do this in either PSM configuration 28 or 128.

It is useful to note that it is possible to exchange the location of the detector 32 and point source 20 in both PSM configurations 28 and 128. The PSM configuration 28 shown in FIGS. 3A and 3B is preferred and corresponds to the classical microscope configuration; however, it may be convenient in some applications to exchange the source 20 and detector 32 locations. Similarly, the PSM configuration 128 shown in FIG. 5 is preferred because is easier to manufacture to tighter alignment tolerances than the design that results by exchanging the source and detector. Again, in some situations, it may be advantageous to exchange source 20 and detector 32.

The fiber source 20 is shown offset a significant distance from the beam splitter cube 30a so that the camera 32 is also a significant distance from the beam splitter, thereby providing space for a moveable lens 62. The moveable lens 62 is left out of the light path when a point image is desired. Insertion of the moveable lens 62 in the path spreads the point of light out on the detector 32 so that interference of the light from the reference 30b and sample 24 may be observed with a sufficiently coherent source 20. The interference pattern present on detector 32 is preferably formed in conjunction with an image of sample 24; however, even if the image of sample 24 is poorly focused, it is possible to identify a null position of the fringe pattern to even higher precision than the best focus and alignment of the point image. It is also possible to design the system 128 so that the moveable lens 62 is in the optical path for point image and out of the path for the interference image. Or the system 128 may be made even more compact by leaving out the space for a moveable lens 62 and moving the point source 20 and camera 32 closer to beam splitter 30a.

Figure 7A:
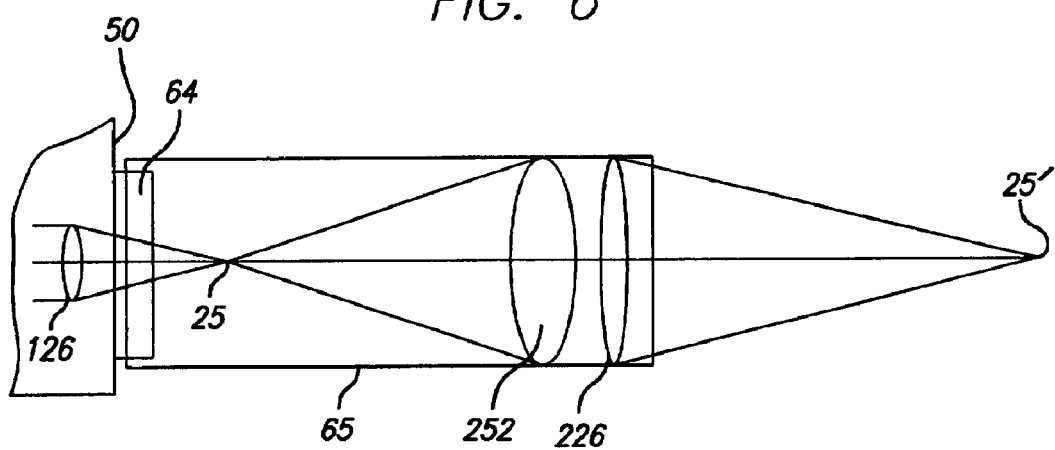
FIGS. 7a–7b are schematic diagrams of auxiliary lenses, where

An auxiliary lens mount 64 is included so that relay lenses (not shown) may be attached to change the working distance, numerical aperture, or both of the system 128. For example, a lens system 65 may be secured to the auxiliary lens mount 64, wherein the lens system includes a collimating lens 252 and an objective lens 226. The objective lens 226 with a longer working distance might be necessary to locate the center-of-curvature of a large convex surface or a larger numerical aperture might be used in locating the center of curvature of a fast lens; see FIG. 7a, which shows a relayed focal point 25'.

Figure 7B:
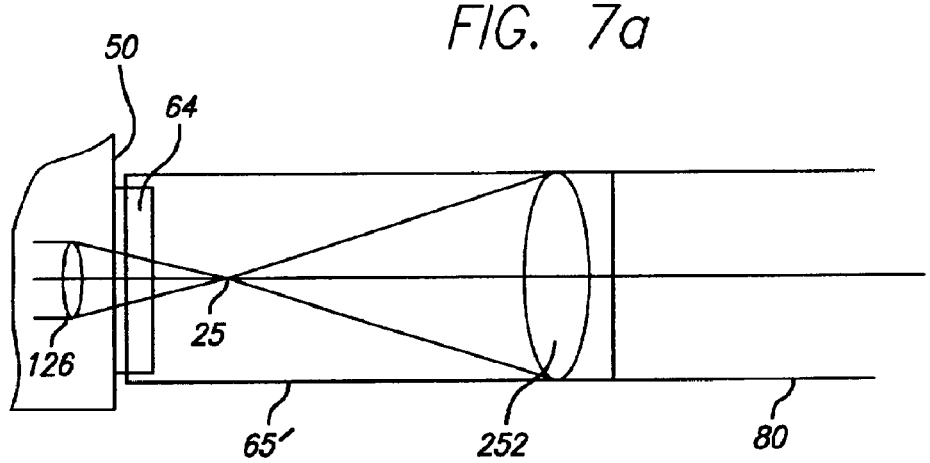

A collimated output beam may be obtained by leaving objective lens 226 out of the system or by the addition of an auxiliary lens having a collimated output 80, as shown in FIG. 7b, which depicts lens system 65' secured to the auxiliary lens mount 64. The collimated output 80 of a PSM is useful for measuring angles between planar surfaces or for the adjustment, in angle, of one planar surface relative to another by measuring the angle between specular reflections from planar surfaces.

Figure 6:
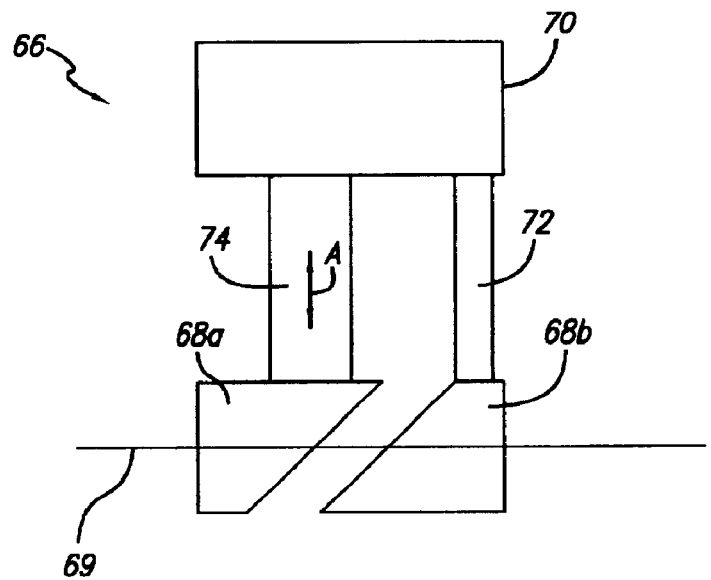
FIG. 6 is a schematic diagram of a phase shifting device employed in the point source microscope of the present invention and utilizing a translating prism.

An optional phase shifting module 66 is shown so that the distance between the focus point of objective lens 126 to either a surface 24 or the center of curvature of a surface 24 can be measured by implementing phase shifting methods, as is well known in the art. An image capture, computing means, software, and human or machine interface is required. The phase shifter, or optical path length modulator, 66 is shown schematically in FIG. 6 and in phantom in FIG. 5 between the beam splitter cube 30a and the sample 24. The principal of operation is to move a prism 68a orthogonal to the beam 69, as indicated by double-headed arrow A; as a result, the optical path length changes, since the index of refraction of the prism 68a and air are different. The changing optical path length results in phase shifting or modulation of the interference pattern seen on the detector 32 in interference mode. Mounting bracket 70 provides an interface to attach phase shifter 66 to PSM 128. Mounting post 72 is used to hold fixed prism 68b. Piezo-electric translator 74 is attached to mounting bracket 70 and functions as a mounting post for moving prism 68a. The length of the piezo-electric translator is a function of an applied voltage. Other similar methods of phase shifting will be obvious to those familiar with the art. If the PSM 128 does not allow for a phase shifting module 66, it can be made even more compact.

A collimating lens 52 may optionally be placed between the spherical reference surface 30b and the phase shifter 66.

The prisms 68a, 68b in the phase shifting module 66 may be oriented such that the optical axis of the output lens is minimally displaced from the optical axis of the reference surface 30b. This has the benefit of allowing a common mechanical axis to be used in fabricating the PSM components. Minimizing the spacing between the prisms 68a, 68b minimizes the amount by which the optical axes are displaced. However, this orientation results in a partial reflection from one or more surfaces of the prisms 68a, 68b, creating a point image on the detector 32. Anti-reflection coatings on the prisms 68a, 68b can be used to reduce or eliminate this problem. As an alternative design choice, the prisms 68a, 68b can be rotated so that any light reflected from the prisms does not return to the detector 32; however, this will result in a displacement of the optical axes that requires more complicated mechanical fabrication.

It is possible to replace the plano-convex lens 30b in FIG. 5 with a concave spherical mirror (not shown) that is separated by a short distance from the surface of the beam splitter 30a. The spherical mirror will act as a reference surface 30b as before. The benefit of this substitution is that phase shifting can be accomplished by an axial translation of the mirror. The mirror could be mounted on a flexure to give axial or approximately axial motion with the motive force from a piezo-electric transducer. The phase-shifter 66 using prisms 68a, 68b is preferred because the output lens axis is closer to the housing making the PSM 128 more generally useful.

An electrical connector 86 is used to supply power to the detector, or camera, 32 and receive a video signal therefrom via connection 88 and to supply a voltage to the phase shifter 66 via connection 90.

A mounting adapter or stud 76 is included to make attachment of the PSM 128 to a coordinate measuring machine or other measuring apparatus or device convenient.

In both embodiments shown for the PSM 28, 128, the point source 20 of optical radiation is located at the apparent center of curvature of the spherical reference surface 30b.

Applications

The problem that motivated the present application was the alignment of a complicated optical system. The PSM 28, 128 provides a non-contact means of locating the defining feature of an optical surface—its center of curvature. Successful, practical experience was obtained by attaching a prototype PSM (FIGS. 3A–3B) based upon the Shack cube to a mill and using the mill bed to translate the optical system. Tooling balls were used to relate mechanical datums (e.g., hole locations, desired optical axis height) to optical datums—the centers of curvature of a series of lenses and mirrors—thereby greatly simplifying the alignment process by providing real time, visual feedback and maximizing the performance of the optical system. Tooling balls are commonly used in conjunction with coordinate measuring machines (CMM) to locate mechanical datums.

Automation of a measurement, alignment or assembly process is possible with integration of a PSM into an automated CMM or other measuring apparatus or machine having coordinated motion. To support automation it is necessary to capture images in a computer from the PSM detector as well as to quantitatively analyze captured images. Quantitative image analysis may be used to determine the distance from optimal focus both longitudinally (focus) and laterally in either standard or interference modes of operation. Additionally, the use of phase shifting techniques in interference mode can further extend the precision of this process. As a result, it is possible to use the PSM as a sensor in a profilometer to measure the surface shape of an object with a sufficiently smooth surface.

A fully automated CMM or other measuring apparatus is not always appropriate. Yet, even when using a PSM in conjunction with a manual CMM or other measuring apparatus quantitative image analysis can be beneficial. For example a dedicated device may be used to generate a calibrated video marker visible on a video monitor. The calibrated video marker can be used to define a tolerance zone to allow for visual comparison against a predefined tolerance for measurement, alignment or assembly applications.

Additionally, it is possible to use a lens design program to locate the apparent center of curvature of an optical element (or tooling ball or pin) as viewed through one or more optical elements. This information can be used when assembling multiple element systems to ensure that each component is properly positioned when locating the center of curvature of an element with a PSM through one or more optical elements.

Additional care is required when performing the assembly and alignment of an optical system involving one or more aspheric elements. Since an aspheric element has a continuous range of radii of curvature, it is often useful to mask an aspheric element so that only a specified portion is viewed, usually the paraxial zone. The size of the mask is set to limit the portion of the aspheric surface used so that the variation of radius of curvature over the exposed portion of the aspheric surface is sufficiently small to produce a good test image in the PSM. If the variation is too large the point image in the PSM will be larger than desired and limit the accuracy of any measurements. Masking an aspheric surface removes the ambiguity that results from the range of radii of curvature that would otherwise exist.

Through use of the PSM, additional benefits have become apparent. The source of these benefits is that a PSM, though using a two-dimensional detector, actually provides information about not only the two lateral coordinates, but also the third coordinate—axial distance. This is because alignment of the PSM to a spherical surface requires correct lateral positioning as well as focus for the axial coordinate, while a CMM with a touch probe only obtains two coordinates per measurement. In practice, a touch probe requires at least four measurements to determine accurately the x-y-z position of a tooling ball, while the PSM obtains simultaneously all three coordinates in one measurement. With recognition of the inherent ability of a PSM to locate all three coordinates in a single measurement, suitable CMM software would permit many measurement applications to be performed using a non-contact probe (the PSM) much more quickly than with a touch probe. One especially useful technique when using a PSM on a CMM is to set the probe-tip radius as zero or effectively zero. As a result, when the PSM is aligned to the center of a tooling ball and a measurement is taken on the CMM with a zero radius probe tip, the center of the tooling ball is measured directly without any offset.

A practical source for a PSM for general use is a fiber-coupled laser diode with an adjustable power level. Higher power settings make it possible to see the PSM illumination directly when scattered or reflected by a surface. This makes it easy to locate the PSM projected spot and to rapidly align the PSM. Switching to lower power may be necessary to avoid saturating the detector. A variable power light source is not necessary in automated applications where the PSM is automatically brought to a nominal position; however, in a manual environment it is frequently helpful.

One of the applications that can make use of the PSM on a CMM is in measuring the location of holes in a plate. The plate can even have varying heights, provided the CMM has sufficient vertical motion. The basic requirement is to set a tooling ball in each hole to be measured. Tooling balls are usually mounted on a stud and the stud place in the hole; however, a bare tooling ball may be used. This does add an operation; however, now a single measurement of the tooling ball is required rather than several touches with a touch probe at each hole.

The height of a plane and its tilt can be measured by placing a tooling pin or plug gauge upon the plate. The PSM will now have a line focus rather than a point focus. The height of the tooling pin can be easily measured as well as tilt of the surface by measuring the tilt of the line focus. Additionally, a pin can be placed in a hole and the center and orientation of the hole can thereby be measured.

The PSM is much more convenient than a touch probe when establishing a full, local coordinate system of a part on a CMM. When determining a plane defined by three tooling balls using a touch probe, it is necessary to measure each ball twice: first measuring all three balls to determine the height of the plane, then measuring two of the balls to determine the rotation of the plane about a vertical axis, and then measuring the remaining ball to define the origin in the x-y plane. Additionally, the measurement of the center of each ball requires several touches of a probe. The same operation with a PSM can be performed by a single measurement that yields the three orthogonal spatial coordinates of the center of each of the three balls.

Accessory lenses can be installed on a PSM to better match specific applications. For example, the testing of a convex surface requires a working distance that is larger than the radii of curvature of the surface being measured. Also, some optical components have a large numerical aperture and need the PSM to match their numerical aperture (NA). Furthermore, an accessory lens that produces a collimated output is very useful since it permits the measurement or comparison of angles, e.g., the direction of the normal of a flat or nearly flat surface.

Fundamental to the operation of the PSM is the use of a point source 20 and the PSM is therefore an ideal source in a Star Test. This makes the PSM useful for measurement of the quality of optical components or systems as well, not just for locating optical or mechanical datums.

PSM Implementation Assembly and Alignment Details

When aligning a PSM, there is a choice as to where the test arm and reference arm point images are located relative to each other when the test arm is focused on a surface (e.g., a cat's eye type reflection). The preferred embodiment of the PSM has a minimum number of adjustments that are typically fixed permanently during assembly. Specifically, the point source to test arm lens element centering is fixed by machining tolerances to a level that is adequate to ensure high quality imaging. Focus of the collimating lens in the test arm may be fixed or adjustable depending upon the need for collimated output. Typically, the focussing lens is permanently fixed, and good, though imperfect, collimation is acceptable removing the need for a focus adjustment of the internal collimating lens. The only adjustment absolutely required is the lateral adjustment of the reference and test point image locations. This is accomplished by alignment of the reference surface 30b that is bonded permanently to the beam splitter 30a during manufacture for robustness and stability.

The preferred alignment mode is to make a cat's eye type reflection by focussing the test arm on a surface 24 so that a point image appears on the camera 32. The reference surface 30b is then slid into place so that the two spots appear as one spot. Usually, UV (ultraviolet) curing adhesive is used to bond the reference surface 30b once alignment is obtained. In use, the PSM test arm point image will always appear coincident with the reference spot laterally for a cat's eye type reflection and will require lateral adjustment for a retroreflection (e.g., focus at the center of curvature of a spherical surface).

An alternative is to intentionally separate the two point images. The benefit of doing this is so that one may more easily identify a cat's eye reflection from a retroreflection and to more easily judge best focus.

Lastly, it is possible to intentionally introduce some astigmatism into the test arm so the spot image created is a point at best focus but becomes a line focus away from best focus. The line focus produced by moving the PSM inside of focus is orthogonal to the line orientation when outside of focus. Astigmatism can be introduced by introducing a weak cylindrical lens between the collimating lens 52 and objective lens 26, 126, for example.

Thus, there has been disclosed a point source microscope (PSM), including its assembly, alignment, and use. It will be readily apparent to those skilled in this art that various changes and modifications of an obvious nature may be made, and all such changes and modifications are considered to fall within the scope of the present invention, as defined by the appended claims.

What is claimed is:

1. A point source module comprising:
 (a) a Shack cube comprising a beam splitter cube having four optically functional faces, with an optical element having a spherical reference surface secured to one of said four faces and defining a reference arm;
 (b) a test arm that is associated with transmission of optical radiation from a source to a sample and through one of the following:
  (i) said reference surface, or
  (ii) a face of said beam splitter cube adjacent said reference surface and on the opposite side of the beam splitting surface from said reference surface;
 (c) a phase shifter situated between said beam splitter cube and said sample;
 (d) a point source of optical radiation whose emissions are incident on a face of said beam splitter cube such that light from said source traverses both said reference arm and said test arm; and
 (e) a detector associated with a face of said beam splitter cube adjacent said source and on the opposite side of the beam splitting surface from said source comprising a detector arm, an objective lens associated with said test arm, or both.

2. The point source module of claim 1 wherein said optical element comprises a plano-convex lens, said convex portion of said lens comprising said spherical reference surface.

3. The point source module of claim 2 wherein said plano-convex lens comprises a partially light absorbing material.

4. The point source module of claim 2 wherein said spherical reference surface has a reflective coating.

5. The point source module of claim 1 further including a moveable lens for an interference mode of operation, said moveable lens situated between said beam splitter cube and said detector.

6. The point source module of claim 1 wherein said phase shifter comprises two prisms.

7. The point source module of claim 6 wherein said two prisms are arranged such that an optical axis of said objective lens is not substantially displaced laterally from an optical axis of said spherical reference surface, and phase shifting is achieved by lateral translation of one prism relative to the other prism.

8. The point source module of claim 7 wherein at least one surface of at least one prism is provided with an antireflection coating to permit use of prisms having a surface normal to incident optical radiation.

9. The point source module of claim 7 wherein said two prisms are spaced apart by a minimum distance so as to minimize displacement of said optical axes.

10. The point source module of claim 6 further including (1) a mechanism for rotating said phase shifting prisms so that no planar surface is normal to incident optical radiation and (2) a mechanism to offset said objective lens axis to match an offset introduced by rotating said prism.

11. The point source module of claim 1 further including a collimating lens between said beam splitter cube and said phase shifter.

12. The point source module of claim 1 further including astigmatism in said objective lens so that an image from a test sample formed on said detector is indicative of direction of focus shift.

13. The point source module of claim 1 wherein said detector is selected from the group consisting of a human eye associated with an eyepiece or an electronic camera with or without additional associated optics.

14. The point source module of claim 1 wherein a filter is placed between said beam splitter cube and said spherical reference surface.

15. The point source module of claim 1 further including either a collimating auxiliary lens to produce a collimated output of optical radiation or an auxiliary lens as part of said objective lens in said test arm to change the working distance, numerical aperture, or both of said point source microscope.

16. A method of aligning a point source module, said point source module comprising:
    (a) a Shack cube comprising a beam splitter cube having four optically functional faces, with an optical element having a spherical reference surface secured to one of said four faces and defining a reference arm;
    (b) a test arm that is associated with transmission of optical radiation from a source to a sample and through one of the following:
        (i) said reference surface, or
        (ii) a face of said beam splitter cube adjacent said reference surface and on the opposite side of the beam splitting surface from said reference surface;
    (c) a point source of optical radiation whose emissions are incident on a face of said beam splitter cube such that light from said source traverses both said reference arm and said test arm; and
    (d) a detector associated with a face of said beam splitter cube adjacent said source and on the opposite side of said beam splitting surface from said source comprising a detector arm, an objective lens associated with said test arm, or both, said method comprising combining a cat's eye-type reflection with said objective lens so that images from said spherical reference surface and from said objective lens are coincident or separated, as desired.

17. The method of claim 16 wherein a focus-adjustable collimating lens is situated between said beam splitter cube and said objective lens to permit adjustment during assembly of said point source module.

18. A method of using a point source microscope, said point source microscope comprising:

(a) a Shack cube comprising a beam splitter cube having four optically functional faces, with an optical element having a spherical reference surface secured to one of said four faces and defining a reference arm;
(b) a test arm comprising an objective lens that is associated with transmission of optical radiation from a source to a sample and through one of the following:
    (i) said reference surface, or
    (ii) a face of said beam splitter cube adjacent said reference surface and on the opposite side of said beam splitting surface from said reference surface;
(c) a point source of optical radiation whose emissions are incident on a face of said beam splitter cube such that light from said source traverses both said reference arm and said test arm; and
(d) a detector associated with the face of said beam splitter cube adjacent said source and on the opposite side of said beam splitting surface from said source so as to receive optical radiation that has reflected from both said spherical reference surface and from said sample after passing through said objective lens, said method comprising combining a cat's eye-type reflection with said objective lens so that images from said spherical reference surface and from said objective lens are coincident or separated, as desired, and obtaining information relating to optical datums, mechanical datums, or both.

19. The method of claim 18 wherein said method comprises simultaneously obtaining three-dimensional coordinate information relating to said optical datums, said mechanical datums, or both.

20. The method of claim 18 further comprising attaching said point source microscope as a sensor to a measuring apparatus for measuring the relative locations of optical datums, mechanical datums, or both.

21. The method of claim 20 wherein said point source microscope is attached to said measuring apparatus for measuring the relative locations of said optical datums, said mechanical datums, or both in three spatial coordinate dimensions simultaneously.

22. The method of claim 20 further comprising computer control of said measuring apparatus to automatically measure a surface of said sample.

23. The method of claim 20 further comprising (1) placing in a hole either a ball or a ball mounted on a stud and (2) measuring location of said ball to determine location of said hole.

24. The method of claim 20 further comprising placing a pin in a hole, and measuring location or tilt or both of said pin to determine to determine location or orientation or both of said hole.

25. The method of claim 20 further comprising placing a cylindrical pin on a part surface to permit measuring height or tilt or both of a part surface when said point source microscope is not normal to said part surface.

26. The method of claim 20 further comprising setting said point source microscope to a prescribed location and using real time visual or video sensor feedback to adjust position or alignment of a part until satisfactory.

27. The method of claim 20 further comprising a video marker on a video monitor that receives a signal from said detector to indicate a tolerance zone of acceptable alignment.

28. The method of claim 20 further comprising attaching said point source microscope to a coordinate measuring apparatus having a probe tip having a radius and specifying said probe tip radius as effectively zero.

29. The method of claim 20 wherein said sample has one or more aspheric surfaces.

30. The method of claim 29 further comprising masking said at least one aspheric surface to obtain an image that uses a portion of said surface with sufficiently small variation of radius of curvature.

31. The method of claim 20 wherein said point source microscope is used to measure quality of an optical component.

32. The method of claim 20 wherein said point source microscope is used in interference mode to increase precision in locating said optical datum or said mechanical datum or both, wherein said interference mode is created by (a) employing as said point source a coherent source of optical radiation and (b) moving a movable lens into the optical path between said detector and said beam splitter cube.

33. The method of claim 20 further comprising capturing an image from said detector in a computer for quantitative analysis of said image.

34. The method of claim 33 further comprising determination of distance of said point source microscope focus from an optimal focus.

35. The method of claim 20 further comprising using phase shifting methods in interference mode to further improve precision with which said optical datums or said mechanical datums or optical performance measurements are determined.

36. The method of claim 20 further comprising using said point source microscope in at least one of assembly, alignment, and inspection of an optical surface, an optical component, or an optical system in conjunction with said measuring apparatus.

37. The method of claim 20 further comprising using said point source microscope as a sensor in a profilometer to measure surface shape of said sample.

38. The method of claim 18 further comprising attaching either a collimating auxiliary lens to produce a collimated output of optical radiation or an auxiliary lens as part of said objective lens in said test arm to change the working distance, numerical aperture, or both of said point source microscope.

39. The method of claim 38 wherein said collimated output of optical radiation permits measurement of angular alignment of said sample.

40. The method of claim 18 further comprising using a variable intensity light source so as to permit an operator to see directly optical radiation incident that is on said sample to simplify alignment to said sample and once the return image is found, to reduce the amount of said optical radiation so that a camera detector is not saturated.

* * * * *